United States Patent
Choi

(10) Patent No.: US 9,029,023 B2
(45) Date of Patent: May 12, 2015

(54) MULTI-LAYERED STRUCTURE ELECTROLYTE FOR LITHIUM ION SECONDARY BATTERY AND LITHIUM ION SECONDARY BATTERY COMPRISING THE SAME

(75) Inventor: Shin Jung Choi, Asan-si (KR)

(73) Assignee: Samsung Fine Chemicals Co., Ltd, Ulsan (KR)

(*) Notice: Subject to any disclaimer, the term of this patent is extended or adjusted under 35 U.S.C. 154(b) by 0 days.

(21) Appl. No.: 13/603,603

(22) Filed: Sep. 5, 2012

(65) Prior Publication Data

US 2013/0260257 A1 Oct. 3, 2013

(30) Foreign Application Priority Data

Apr. 2, 2012 (KR) .................. 10-2012-0034029

(51) Int. Cl.
| | | |
|---|---|---|
| *H01M 10/056* | (2010.01) | |
| *H01M 10/0525* | (2010.01) | |
| *H01M 10/0565* | (2010.01) | |
| *H01M 10/0562* | (2010.01) | |

(52) U.S. Cl.
CPC ........ *H01M 10/056* (2013.01); *H01M 10/0565* (2013.01); *Y02E 60/122* (2013.01); *H01M 10/0562* (2013.01); *H01M 2300/0068* (2013.01); *H01M 2300/0085* (2013.01); *H01M 10/0525* (2013.01)

(58) Field of Classification Search
CPC .......... H01M 10/0525; H01M 10/056; H01M 10/0562; H01M 10/0565; H01M 2300/0068; H01M 2300/0085; Y02E 60/122
USPC ......... 429/400–535, 126, 188, 300, 304, 319, 429/321, 322
See application file for complete search history.

(56) References Cited

U.S. PATENT DOCUMENTS

| | | | | |
|---|---|---|---|---|
| 6,045,952 A | * | 4/2000 | Kerr et al. ..................... | 429/307 |
| 6,190,806 B1 | | 2/2001 | Kumar et al. | |
| 6,509,123 B1 | * | 1/2003 | Shibuya et al. ............... | 429/303 |
| 7,682,740 B2 | * | 3/2010 | Yong et al. .................... | 429/251 |
| 2003/0205467 A1 | | 11/2003 | Fu | |
| 2007/0048617 A1 | * | 3/2007 | Inda .............................. | 429/304 |
| 2009/0226790 A1 | * | 9/2009 | Kanamura et al. ............ | 429/30 |

(Continued)

FOREIGN PATENT DOCUMENTS

| | | |
|---|---|---|
| CN | 1293461 A | 5/2001 |
| CN | 1925203 A | 3/2007 |

(Continued)

OTHER PUBLICATIONS

Extended European Search Report issued Nov. 23, 2012 in corresponding European Patent Application No. 12179371.5.

(Continued)

*Primary Examiner* — Milton I Cano
*Assistant Examiner* — Ling R Zeng
(74) *Attorney, Agent, or Firm* — Osha Liang LLP

(57) ABSTRACT

Provided are a multi-layered structure electrolyte including a gel polymer electrolyte on opposite surfaces of a ceramic solid electrolyte, for a lithium ion secondary battery including positive and negative electrodes capable of intercalating/deintercalating lithium ions, and a lithium ion secondary battery including the electrode. The electrolyte includes a gel polymer electrolyte on opposite surfaces of a ceramic solid electrolyte.

9 Claims, 1 Drawing Sheet

(56) References Cited

U.S. PATENT DOCUMENTS

2011/0262836 A1   10/2011  Kumar et al.
2011/0281173 A1*  11/2011  Singh et al. .................. 429/306
2011/0318650 A1*  12/2011  Zhang et al. .................. 429/320
2014/0170465 A1   6/2014   Visco et al.

FOREIGN PATENT DOCUMENTS

| CN | 101702444 A | 5/2010 |
| CN | 102272990 A | 12/2011 |
| EP | 0865092 | 9/1998 |
| EP | 2136431 | 12/2009 |
| JP | 10-255842 | 9/1998 |
| KR | 10-0490642 | 5/2005 |
| KR | 10-2011-0106342 | 9/2011 |
| WO | 94/24715 | 10/1994 |
| WO | 2009/067425 | 5/2009 |
| WO | 2009/070600 | 6/2009 |

OTHER PUBLICATIONS

A. Manuel Stephan et al., "Review on composite polymer electrolytes for lithium batteries", Polymer, Vo. 47, No. 16, 2006, pp. 5952-5964.
Korean Office Action issued Jul. 15, 2013 in corresponding Korean Application No. 10-2012-0034029.
Office Action issued in corresponding Chinese Application No. 201210480480.7 with partial English translation dated Dec. 3, 2014 (8 pages).

* cited by examiner

MULTI-LAYERED STRUCTURE ELECTROLYTE FOR LITHIUM ION SECONDARY BATTERY AND LITHIUM ION SECONDARY BATTERY COMPRISING THE SAME

CROSS-REFERENCE TO RELATED APPLICATION

This application claims priority to and the benefit of Korean Patent Application No. 10-2012-0034029, filed on Apr. 2, 2012, the entire content of which is incorporated herein by reference.

BACKGROUND OF THE INVENTION

1. Field of the Invention

Aspects of the present invention relate to an electrolyte for a lithium ion secondary battery and a lithium ion secondary battery comprising the same. More particularly, the present invention relates to a multi-layered structure electrolyte including a gel polymer electrolyte on opposite surfaces of a ceramic solid electrolyte, for a lithium ion secondary battery including positive and negative electrodes capable of intercalating/deintercalating lithium ions, and a lithium ion secondary battery including the electrode.

2. Description of the Related Art

Recently, with the development of portable devices such as cellular phones, camcorders, or notebook computers and increasing demand for slim and lightweight of the portable devices, there has been an increasing demand for high capacity, long cycle life and high stability of the lithium ion secondary battery. In addition, much attention is being paid to electric vehicles and lithium ion secondary batteries are drawing attention as power sources for electric vehicles.

A lithium ion secondary battery generally includes a positive electrode, a negative electrode, a separator for preventing a physical contact between the positive electrode and negative electrodes, and an electrolyte for transmitting lithium ions. The lithium ion secondary battery generates electrical energy by electrochemical oxidation and reduction.

In the lithium ion secondary battery, a liquid electrolyte is generally used as a medium of transferring ions of the positive and negative electrodes. However, the liquid electrolyte has a high probability of deformation or explosion due to liquid leakage or use of a combustible material and is unstable at high temperature due to use of a volatile solvent.

Therefore, recently, use of a solid electrolyte, instead of the liquid electrolyte, is under investigation. As an incombustible material, which is highly stable and nonvolatile, is used for the solid electrolyte, the solid electrolyte is stable at high temperature. In addition, since the solid electrolyte serves as a separator, the separator is not required, unlike in the conventional solid electrolyte, enabling a thin film formation process.

However, the conventional solid electrolyte has high interface resistance due to a point contact between an electrode and the solid electrolyte, low ion conductivity and lowered flexibility, making it difficult to be applied to a role to role process.

BRIEF SUMMARY OF THE INVENTION

Aspects of the present invention provide a multi-layered electrolyte for a lithium ion secondary battery, which has high ion conductivity and improved flexibility, and a lithium ion secondary battery including the electrolyte.

In accordance with one aspect of the present invention, there is provided a multi-layered structure electrolyte for a lithium ion secondary battery including positive and negative electrodes capable of intercalating/deintercalating lithium ions, the multi-layered structure electrolyte comprising a ceramic solid electrolyte and a gel polymer electrolyte provided on opposite surfaces of the ceramic solid electrolyte.

The ceramic solid electrolyte may include at least one compound selected from the group consisting of $Li_2S$—$P_2S_5$, $Li_2S$—$P_2S_5$—$L_4SiO_4$, $Li_2S$—$Ga_2S_3$—$GeS_2$, $Li_2S$—$Sb_2S_3$—$GeS_2$, $Li_{3.25}$—$Ge_{0.25}$—$P_{0.75}S_4$, $(La,Li)TiO_3$ (LLTO), $Li_6La_2CaTa_2O_{12}$, $Li_6La_2ANb_2O_{12}$ (A=Ca, Sr), $Li_2Nd_3TeSbO_{12}$, $Li_3BO_{2.5}N_{0.5}$, $Li_9SiAlO_8$, $Li_{1+x}Al_xGe_{2-x}(PO_4)_3$ (LAGP), $Li_{1+x}Al_xTi_{2-x}(PO_4)_3$ (LATP), $Li_{1+x}Ti_{2-x}Al_xSi_y(PO_4)_{3-y}$, $LiAl_xZr_{2-x}(PO_4)_3$, and $LiTi_xZr_{2-x}(PO_4)_3$.

The ceramic solid electrolyte may include at least one compound selected from the group consisting of $(La,Li)TiO_3$ (LLTO), $Li_{1+x}Al_xTi_{2-x}(PO_4)_3$ (LATP), and $Li_{1+x}Ti_{2-x}Al_xSi_y(PO_4)_{3-y}$.

The ceramic solid electrolyte may include as a binder at least one compound selected from the group consisting of poly(ethylene oxide) (PEO), polyimide, poly(acrylonitrile), poly(methyl methacrylate), and poly(vinylidne fluoride) (PVDF).

The binder may be poly(vinylidne fluoride) (PVDF).

The binder may be used in an amount of 0.1 to 50 parts by weight based on 100 parts by weight of the ceramic solid electrolyte.

The ceramic solid electrolyte may have a thickness in a range of 10 μm to 1,000 μm.

The gel polymer electrolyte may include a polymer and a lithium salt in a molar ratio of 8:1 to 16:1.

The gel polymer electrolyte disposed at a negative electrode side may include ethylene carbonate (EC) in an amount of 1 to 50 wt %.

In accordance with another aspect of the present invention, there is provided a lithium ion secondary batter including the electrolyte.

As described above, according to the present invention, the electrolyte for a lithium ion secondary battery, which has high ion conductivity and improved flexibility can be provided.

In addition, according to the present invention, the lithium ion secondary battery including the electrolyte provides high safety by providing improved battery capacity and rate characteristics and can prevent explosion and fire under a high-temperature or over-voltage condition.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Figure 1:
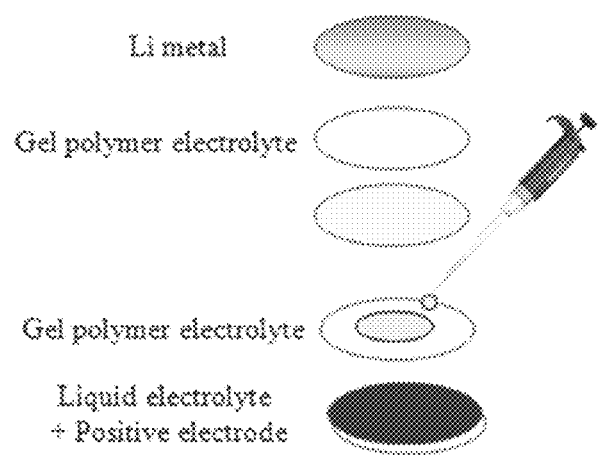
FIG. 1 is a schematic diagram illustrating fabrication of a lithium ion secondary battery according to the present invention.

Hereinafter, embodiments of the present invention will be described in detail with reference to the accompanying drawings.

The present invention provides a multi-layered structure electrolyte for a lithium ion secondary battery including positive and negative electrodes capable of intercalating/deintercalating lithium ions, the multi-layered structure electrolyte comprising a ceramic solid electrolyte and a gel polymer electrolyte provided on opposite surfaces of the ceramic solid electrolyte.

In the present invention, the electrolyte is a multi-layered structure electrolyte including a gel polymer electrolyte on opposite surfaces of a ceramic solid electrolyte. Here, the gel polymer electrolytes disposed on the opposite surfaces of the ceramic solid electrolyte may have the same component or different components.

The electrolyte for a lithium ion secondary battery according to the present invention, including a ceramic solid electrolyte and a gel polymer electrolyte, may increase battery capacity and rate characteristics by reducing interface resistance due to existence of the gel polymer electrolyte. In addition, use of the ceramic solid electrolyte may prevent explosion or fire due to an electrical short circuit between positive and negative electrodes under a high-temperature or overvoltage condition.

The ceramic solid electrolyte may be prepared using an inorganic ceramic such as sulfides, oxides or phosphides. Examples of the sulfide-based inorganic ceramic may include $Li_2S$—$P_2S_5$, $Li_2S$—$P_2S_5$—$Li_4SiO_4$, $Li_2S$—$Ga_2S_3$—$GeS_2$, $Li_2S$—$Sb_2S_3$—$GeS_2$, $Li_{3.25}$—$Ge_{0.25}$—$P_{0.75}S_4$ (Thio-LISICON), and so on, and demonstrates high ion conductivity and high reactivity with moisture. Examples of the oxide-based inorganic ceramic may include $(La,Li)TiO_3(LLTO)$, $Li_6La_2CaTa_2O_{12}$, $Li_6La_2ANb_2O_{12}(A=Ca, Sr)$, $Li_2Nd_3TeSbO_{12}$, $Li_3BO_{2.5}N_{0.5}$, $Li_9SiAlO_8$, and so on. Examples of the phosphide-based inorganic ceramic may include $Li_{1+x}Al_xGe_{2-x}(PO_4)_3(LAGP)$, $Li_{1+x}Al_xTi_{2-x}(PO_4)_3$ (LATP), $Li_{1+x}Ti_{2-x}Al_xSi_y(PO_4)_{3-y}$, $LiAl_xZr_{2-x}(PO_4)_3$, $LiTi_xZr_{2-x}(PO_4)_3$, and so on, where $0 \leq x \leq 1$ and $0 \leq y \leq 1$. The oxide- and phosphide-based solid electrolytes are stable compounds while having lower ion conductivity than the sulfide-based solid electrolyte, and can be used as coating materials of an electrode and a separator. Preferably, $Li_{1+x}Al_xTi_{2-x}(PO_4)_3$(LATP) or $(La,Li)TiO_3$ (LLTO) may be used as the electrolyte.

In the present invention, the ceramic solid electrolyte may include a Teflon based material, for example, PVDF, as a binder. Since PVDF has a flexible mechanical property, a thin and flexible electrolyte having excellent ion conductivity can be prepared when it is used in a solid ceramic electrolyte.

The binder is preferably used in an amount of 0.1 to 50 parts by weight based on 100 parts by weight of the ceramic solid electrolyte. When the amount of the binder used is within the range stated above, mechanical strength and flexibility of the electrolyte can be improved.

In the present invention, the ceramic solid electrolyte has a thickness in a range of 10 µm to 1,000 µm, preferably in a range of 10 µm to 100 µm. If the thickness of the ceramic solid electrolyte is within the range stated above, the electrolyte having improved mechanical strength and flexibility and excellent ion conductivity can be obtained.

The gel polymer electrolyte includes a polymer, an organic solvent and a lithium salt and is a hybrid gel electrolyte having the organic solvent and the lithium salt mixed with the polymer.

The polymer serves as a support of the electrolyte, and examples thereof may include poly(ethylene oxide) (PEO), polyimide, poly(acrylonitrile), poly(methyl methacrylate), and poly(vinylidne fluoride) (PVDF). Preferably, PEO or polyimide having a molecular weight in a range 100,000 to 600,000 is used as the polymer.

The organic solvent serves as a plasticizer capable of dissolving the polymer well and is chemically stable. Examples of the organic solvent may include propylene carbonate, dimethyl carbonate, diethyl carbonate, methylpropyl carbonate, ethylpropyl carbonate, methylethyl carbonate, butylene carbonate, dimethyl sulfoxide, acetonitrile, and so on, which can be used alone or in combination.

The lithium salt may include at least one selected from the group consisting of $LiClO_4$, $LiCF_3SO_3$, $LiPF_6$, $LiBF_4$ and $LiN(CF_3SO_2)_2$. Preferably, $LiClO_4$ is used as the lithium salt because it is stable owing to a small probability of reacting with moisture.

In the gel polymer electrolyte according to the present invention, the polymer and the lithium salt are preferably mixed in a molar ratio of 8:1 to 16:1. When the mixture ratio is within the range stated above, high ion conductivity for achieving battery performance is demonstrated.

In the present invention, the gel polymer electrolyte, disposed at a negative electrode side, including ethylene carbonate (EC) in an amount of 1 to 50 wt %, forms a solid electrolyte interface (SEI) film. Since ethylene carbonate (EC) is contained in the amount in the range stated above, a direct side reaction between lithium (Li) and the ceramic solid electrolyte can be suppressed.

Preferably, the ion conductivity is maximized by adjusting the viscosity of the gel polymer electrolyte to be as low as possible to prevent the gel polymer electrolyte from flowing. That is to say, it is necessary to prevent the gel polymer electrolyte from flowing so as not to make contact with the ceramic solid electrolyte. The ion conductivity is adjusted to be less than that of ceramic solid electrolyte.

The present invention provides a lithium ion secondary battery including a positive electrode and a negative electrode capable of intercalating/deintercalating lithium ions, and the electrolyte according to the present invention.

The electrode used in the lithium ion secondary battery is generally prepared by forming a slurry by mixing an active material, a binder and a conductive agent with a solvent, and coating the slurry on an electrode current collector, drying and compressing the same.

In the lithium ion secondary battery according to the present invention, artificial graphite, natural graphite, carbon fiber, cokes, carbon black, carbon nanotube, fullerene, activated carbon, lithium metal or lithium alloy may be used as a negative active material. A lithium metal oxide such as $LiCoO_2$, $LiNiO_2$, $LiMnO_3$, $LiMn_2O_3$, $LiMnO_2$, $LiMn_2O_4$, or $LiFePO_4$ may be used as a positive active material.

The current collector of the lithium ion secondary battery serves to collect electrons by an electrochemical reaction of the active material or to offer electrons required for an electrochemical reaction.

A negative electrode current collector may be any current collector so long as it has high conductivity without causing chemical changes in the battery that is to be formed. Examples of the negative electrode current collector include copper, nickel, titanium, sintered carbon, stainless steel, copper or stainless steel that is surface-treated with carbon, nickel, titanium, or silver, an aluminum-cadmium alloy.

A positive electrode current collector may be any current collector so long as it has high conductivity without causing chemical changes in the battery that is to be formed. Examples of the positive electrode current collector include stainless steel, aluminum, nickel, titanium, sintered carbon, and aluminum or stainless steel that is surface-treated with carbon, nickel, titanium, or silver.

Each of the positive and negative electrode current collectors is processed to form fine irregularities on the surfaces thereof so as to enhance adhesive strength of the current collector to the electrode active material, and may be used in any of various forms including films, sheets, foils, nets, porous structures, foams, and non-woven fabrics.

The binder facilitates binding between the electrode active material and the conducting agent. Examples of the binder include compounds generally used in forming the lithium ion secondary battery, such as polyvinylidene fluoride (PVDF), polypropylene, carboxymethylcellulose (CMC), starch, hydroxypropylcellulose, polyvinylpyrrolidone, tetrafluoroethylene, polyethylene, ethylene-propylene-diene terpolymer (EPDM), polyvinyl alcohols, styrene butadiene rubber, fluoro rubber, and various copolymers.

The conducting agent is not particularly limited, and may be any material so long as it has a suitable conductivity without causing chemical changes in the battery that is to be formed. Examples of the conductive material include graphite such as natural graphite or artificial graphite; carbon blacks such as acetylene black, Denka black, Ketjen black, channel black, lamp black, and thermal black; conductive fibers such as carbon fibers and metallic fibers; conductive metal oxides such as titanium oxide; and metallic powders such as aluminum powder or nickel powder.

The lithium ion secondary battery according to the present invention may be manufactured by making the positive and negative electrodes coated with gel polymer electrolyte wet by one drop of a liquid electrolyte commonly used for the lithium ion secondary battery, placing a ceramic solid electrolyte between the electrodes, followed by vacuum drying. Here, the gel polymer electrolytes disposed on opposite surfaces of the ceramic solid electrolyte may have the same component or different components.

In addition, the lithium ion secondary battery according to the present invention may have various shapes, including a coin shape, a button shape, a sheet shape, a cylinder shape, a flat shape, and a prismatic shape, which are commonly used for the lithium ion secondary battery.

Hereinafter, examples and comparative examples of the present invention will be described. However, the following examples are merely presented to exemplify the present invention, and the scope of the present invention is not limited thereto.

EXAMPLES

Example 1

(Preparation of Ceramic Solid Electrolyte)

$Li_2CO_3$, $Al_2O_3$, $TiO_2$, and $(NH_4)H_2PO_4$ were mechanically mixed in a molar ratio of 0.7:0.2:1.6:3, and sintered at 350° C. for 48 hours to dissolve $(NH_4)H_2PO_4$. Then, the sintered materials were pulverized using a zirconia ball mill for sorting particles having a diameter of less than 8 mm using a mesh. The sorted particles were heat-treated at 950° C. for 8 hours, yielding LATP powder.

10 g of the thus obtained ceramic powder as a binder was uniformly mixed with 1 g of PVDF. The resultant mixture was subjected to pressing using a pellet press device (manufactured by Carver in the model name of 4350) to prepare a circular ceramic solid electrolyte having a thickness of 100 μm and a diameter of 16 mm. A flexibility test was performed on the prepared sheet-type solid electrolyte.

(Preparation of Positive Electrode)

$LiCoO_2$ as a positive electrode active material, Denka Black as a conductive agent, and PVDF as a binder were mixed in a ratio of 94:3:3 to prepare a slurry using an NMP solvent. The obtained mixture was coated on an Al foil by bar coating and dried under vacuum at 120° C., thereby preparing a positive electrode.

(Preparation of Gel Polymer Electrolyte)

Poly(ethylene oxide) (PEO)—(CH2CH2O)— and $LiClO_4$ were mixed such that the polymer and a lithium salt were contained in a molar ratio of 8:1, 1 g of the mixture powder was dissolved in 9 g of acetonitrile, giving a viscous mixture solution. The mixture solution was coated on positive electrode and a Li negative electrode by bar coating, followed by drying and evaporating an organic solvent, thereby preparing positive and negative electrodes coated with the gel polymer electrolyte.

(Manufacture of Battery)

Figure 2:
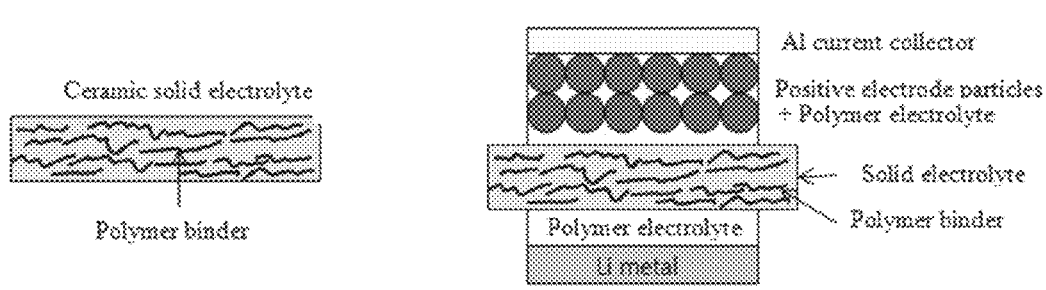
FIG. 2 is a cross-sectional view of a battery manufactured in Example 1 of the present invention.

The positive and negative electrodes coated with the prepared polymer electrolyte were wet by a drop of a liquid electrolyte (1.3M $LiPF_6$, EC:EMC:DEC=3:2:5), a ceramic solid electrolyte was placed between the electrodes, followed by vacuum drying, thereby manufacturing a battery. A process of manufacturing the battery is shown in FIG. 1 and a configuration of the manufactured battery is shown in FIG. 2.

(Evaluation)

The manufactured battery was charged until a battery voltage reached 4.2V and the temperature was raised to reach 150° C. at a rate of 5° C./min and then allowed to stand at 150° C. for 10 minutes.

The manufactured battery was charged at a constant current of 0.2 C until a battery voltage reached 12V.

Example 2

(Preparation of Ceramic Solid Electrolyte)

The ceramic solid electrolyte was prepared in the same manner as in Example 1.

(Preparation of Positive Electrode)

The positive electrode was prepared in substantially the same manner as in Example 1, except that $LiMn_2O_4$ was used as a positive electrode active material.

(Preparation of Gel Polymer Electrolyte)

The gel polymer electrolyte was prepared in the same manner as in Example 1.

(Manufacture of Battery)

The battery was manufactured in the same manner as in Example 1.

(Evaluation)

The manufactured battery was evaluated in the same manner as in Example 1.

Comparative Example

Comparative Example 1

(Preparation of Ceramic Solid Electrolyte)

The ceramic solid electrolyte was prepared in the same manner as in Example 1.

(Preparation of Positive Electrode)

The positive electrode was prepared in the same manner as in Example 1.

(Preparation of Gel Polymer Electrolyte)

Poly(ethylene oxide) (PEO)—(CH2CH2O)— and $LiClO_4$ were mixed such that the polymer and a lithium salt were contained in a molar ratio of 8:1, 1 g of the mixture powder was dissolved in 9 g of acetonitrile, giving a viscous mixture solution. The mixture solution was coated on a Li negative electrode by bar coating, followed by drying and evaporating an organic solvent, thereby preparing a negative electrode coated with the gel polymer electrolyte.

(Manufacture of Battery)

The battery was manufactured using a Li negative electrode coated with the polymer electrolyte and a positive electrode without the polymer electrolyte coated thereon, and a ceramic solid electrolyte was placed between the positive and negative electrodes.

(Evaluation)

The manufactured battery was evaluated in the same manner as in Example 1.

Comparative Example 2

The preparation of electrode, manufacture of battery and evaluation were carried out in substantially the same manner as in Comparative Example 1, except that $LiMn_2O_4$ was used as a positive electrode active material.

Comparative Example 3

The battery was manufactured in substantially the same manner as in Example 1, except that instead of a ceramic solid electrolyte, a gel polymer electrolyte was used to the same thickness as the ceramic solid electrolyte of Example 1, and the manufactured battery was evaluated in the same manner as in Example 1.

Comparative Example 4

The battery was manufactured in substantially the same manner as in Example 1, except that instead of a ceramic solid electrolyte, a gel polymer electrolyte was used to the same thickness as the ceramic solid electrolyte of Example 1, and the manufactured battery was evaluated in the same manner as in Example 2.

Comparative Example 5

(Preparation of Positive Electrode)

The positive electrode was prepared in the same manner as in Example 1.

(Manufacture of Battery)

The battery was manufactured using the prepared positive electrode, a Li negative electrode, a PE separator, and a liquid electrolyte (1.3M $LiPF_6$, EC:EMC:DEC=3:2:5) without using a ceramic solid electrolyte, and the manufactured battery was evaluated in the same manner as in Example 1.

Comparative Example 6

(Preparation of Positive Electrode)

The positive electrode was prepared in the same manner as in Example 2.

(Manufacture of Battery)

The battery was manufactured using the prepared positive electrode, a Li negative electrode, a PE separator, and a liquid electrolyte (1.3M $LiPF_6$, EC:EMC:DEC=3:2:5) without using a ceramic solid electrolyte, and the manufactured battery was evaluated in the same manner as in Example 2.

Comparative Example 7

A ceramic solid electrolyte was prepared in the same manner as in Example 1, except for a thickness of 1,000 μm, and the flexibility of the prepared ceramic solid electrolyte was tested.

The ion conductivity and flexibility of each of the ceramic solid electrolytes prepared in Examples and the results thereof are shown in Table 1.

Measurement of Ion Conductivity

The ion conductivity of each ceramic solid electrolyte was measured using an impedance measuring device (manufactured by Bio-Logic SAS in the model name of VSP. Here, frequencies ranging from 1M Hz to 1 Hz were scanned in an open circuit potential with an amplitude of 10 mV.

Measurement of Flexibility

The electrolytes demonstrated flexibility with angles in a range of 1° to 5°.

Measurement of Battery Capacity

The manufactured batteries were charged and discharged twice at a constant current of 0.1 C with voltages ranging from 3.0 V to 4.2 V.

Evaluation of Safety

High temperature evaluation: The manufactured batteries were charged at a constant current of 1 C until battery voltages reached 4.2 V, and the temperature was raised up to 150° C. at a rate of 5° C./min, and then allowed to stand at 150° C. for 10 minutes.

Overcharge evaluation: The manufactured batteries were charged at a constant current of 0.2 C until battery voltages reached 12 V.

TABLE 1

| | Ionic conductivity | Battery capacity | High-temperature safety | Over-charge safety | Flexibility |
|---|---|---|---|---|---|
| Example 1 | $1.2 \times 10^{-4}$ S/cm | 56 mAh/g | Pass | Pass | 5° |
| Example 2 | — | 54 mAh/g | Pass | Pass | — |
| Comparative Example 1 | — | 4 mAh/g | Pass | Pass | — |
| Comparative Example 2 | — | 3 mAh/g | Pass | Pass | — |
| Comparative Example 3 | — | 98 mAh/g | Explosion | Explosion | — |
| Comparative Example 4 | — | 95 mAh/g | Explosion | Explosion | — |
| Comparative Example 5 | — | 125 mAh/g | Explosion | Explosion | — |
| Comparative Example 6 | — | 122 mAh/g | Explosion | Explosion | — |
| Comparative Example 7 | $1.1 \times 10^{-4}$ S/cm | | | | 1° |

As shown in Table 1, the lithium ion secondary battery according to the present invention, including the ceramic solid electrolyte and the gel polymer electrolyte, has higher battery capacity than batteries using a positive electrode without a gel polymer electrolyte coated (Comparative Examples 1 and 2). In addition, the lithium ion secondary battery according to the present invention has improved safety under a high-temperature, over-charge condition, compared to batteries without a ceramic solid electrolyte (Comparative Examples 3 to 6).

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A multi-layered structure electrolyte for a lithium ion secondary battery including positive and negative electrodes capable of intercalating/deintercalating lithium ions, the multi-layered structure electrolyte comprising;

a ceramic solid electrolyte that includes a poly(vinylidine fluoride) (PVDF) as a polymer binder; and a gel polymer electrolyte provided on opposite surfaces of the ceramic solid electrolyte, wherein the ceramic solid electrolyte includes at least one compound selected from the group consisting of (La, Li)TiO$_3$(LLTO), Li$_{1+x}$Al$_x$Ti$_{2-x}$(PO$_4$)$_3$ (LATP), and Li$_{1+x}$Ti$_{2-x}$Al$_x$Si$_y$(PO$_4$)$_{3-y}$, and wherein the gel polymer electrolyte disposed at a negative electrode side includes ethylene carbonate (EC) in an amount from about 1 to about 50 wt %.

2. The electrolyte of claim 1, wherein the polymer binder is used in an amount of 0.1 to 50 parts by weight based on 100 parts by weight of the ceramic solid electrolyte.

3. The electrolyte of claim 1, wherein the ceramic solid electrolyte has a thickness in a range of 10 μm to 1,000 μm.

4. The electrolyte of claim 1, wherein the gel polymer electrolyte includes a polymer and a lithium salt in a molar ratio of 8:1 to 16:1.

5. A lithium ion secondary battery including the electrolyte of claim 1.

6. A lithium ion secondary battery including the electrolyte of claim 3.

7. A lithium ion secondary battery including the electrolyte of claim 4.

8. A lithium ion secondary battery comprising:

a pair of electrodes;

a ceramic solid electrolyte that includes a polymer poly (vinylidine fluoride) (PVDF) as a binder;

a first gel electrolyte provided on a first surface of the ceramic solid electrolyte, the first gel electrolyte being a film coated onto one of the electrodes and being wetted by a liquid electrolyte; and a second gel polymer electrolyte provided on a second surface of the ceramic solid electrolyte opposite to the first surface and wetted by a liquid electrolyte, wherein the ceramic solid electrolyte includes at least one compound selected from the group consisting of (La, Li)TiO$_3$(LLTO), Li$_{1+x}$Al$_x$Ti$_{2-x}$(PO$_4$)$_3$ (LATP), and Li$_{1+x}$Ti$_{2-x}$Al$_x$Si$_y$(PO$_4$)$_{3-y}$, and wherein the gel polymer electrolyte disposed at a negative electrode side includes ethylene carbonate (EC) in an amount from about 1 to about 50 wt %.

wherein the gel polymer electrolyte disposed at a negative electrode side includes ethylene carbonate (EC) in an amount of about 1 to about 50 wt %.

9. The lithium ion secondary battery of claim 8, wherein the first gel electrolyte comprises a polymer that is poly (ethylene oxide) (PEO) or polyimide having a molecular weight in a range 100,000 to 600,000, the one of the electrodes contains lithium or a lithium alloy, and the liquid electrolyte includes ethylene carbonate (EC).

\* \* \* \* \*